Oct. 5, 1948.  E. SCHABER  2,450,487

TIRE CHAIN

Filed April 12, 1945

*INVENTOR.*
ELMER SCHABER
BY *Allen & Allen*
ATTORNEYS

Patented Oct. 5, 1948

2,450,487

UNITED STATES PATENT OFFICE 2,450,487

TIRE CHAIN

Elmer Schaber, Cold Spring, Ky.

Application April 12, 1945, Serial No. 587,940

3 Claims. (Cl. 152—242)

My invention relates to automobile tire chains of the usual type having side chains which extend peripherally around the wheel, and cross chains which extend across the tread of the wheel or tire, and are connected to the side chains.

In the usual structure of tire chain of this type the attachment of the cross chains to the side chains is accomplished by bending a cross chain link to close it around a side chain link. This requires the use of a suitable tool, and requires considerable skill to do it properly, hence the replacement of worn out cross chains is a job for the garage mechanic and not for the usual driver of a motor car.

This fact would not be such an element of dissatisfaction if it were not for the way in which the cross chains wear out and clatter against the fenders of an automobile, requiring repairs on the road for driving comfort and safety. It is the object of the present invention to supply a cross link construction and an attaching device which permits of easy replacement or removal of broken sections without the use of special tools or knowledge of special technique.

I am aware that cross chains with helical end links have been suggested for automobile tire chains, but my use of a helix as an attaching device as a separable element is quite different in its structure and utility.

I have illustrated in the drawings an embodiment of my invention and will describe the same as an example of the invention and in the claims which follow will set forth the novelty inherent in the structure.

Figure 1:
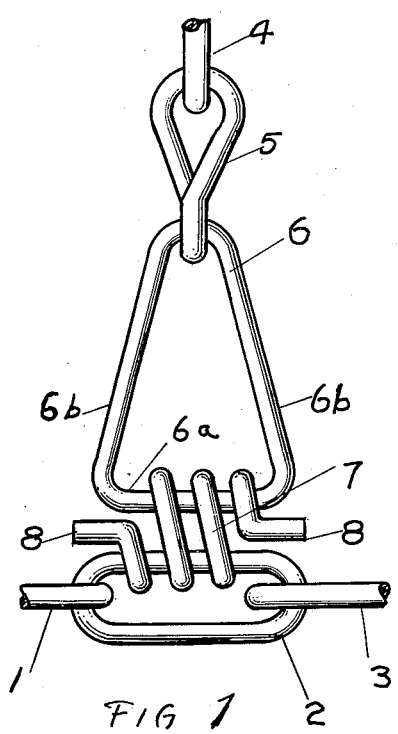
Figure 1 is a fragmentary view of the terminal links of a cross chain according to my invention, in connected relation with a side chain link.
Figure 2:
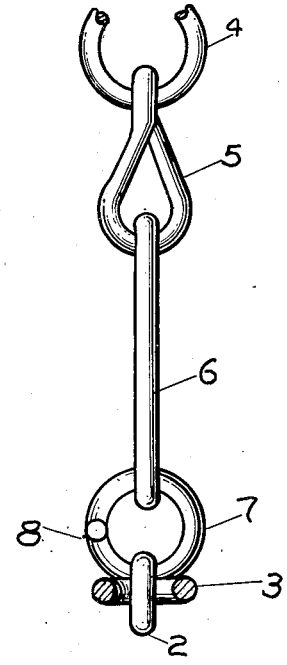
Figure 2 is a side elevation of the parts shown in Figure 1.

It is not believed to be necessary to show a complete tire chain. Thus in Figure 1 I have shown three links 1, 2, and 3 of a side chain, it being understood that there will be two side chains used. I have not shown an entire cross chain, but for simplicity have shown two ordinary links 4 and 5 of a cross chain and an end link 6 of triangular shape, it being understood that there will be a like end link at each end of the cross chain.

Regarding the link 6 it will be noted that the outer limb 6a of the triangular link is shorter than the two other limbs 6b, which are secured to the cross chain link 5 at their point of interconnection.

The attaching device is simply a helix 7 of sufficient diameter to embrace one limb of the side chain link to which it is to be attached and also one limb of the end link. The ends 8 of the helix are bent axially of the helix so as to extend the end to end dimension of the helix to a greater length than the limb 6a of the triangular cross chain end link.

Figure 3:
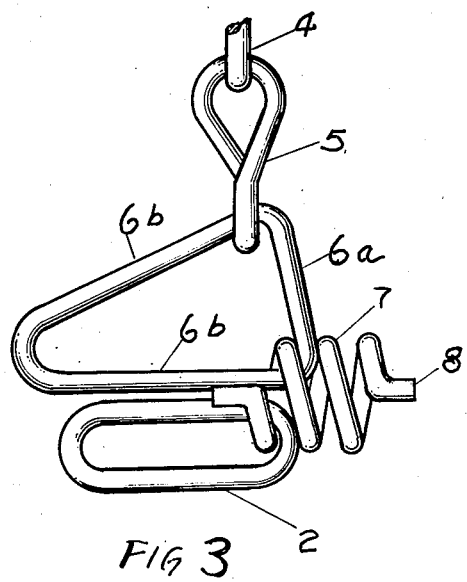
Figure 3 is a view showing the mode of attachment of the cross chain terminal link to a side chain link.

In mounting the helix, as shown in Figure 3, the triangular link is swung so that one of its limbs 6b lies alongside of the selected side chain link. The helix is then simply screwed on. The thread or spacing of the windings of the helix is preferably a little tight in its fit over the limbs of the two links, but it can be sprung to a position of engaging over both, whereupon by screwing with the finger it can be brought to a position with the helical portions entirely engaged over the side chain link and the limb 6b of the cross chain end link. The end link is then rotated in the helix until the helix comes to a position as shown in Figure 1, in which the straight ends are such that the helix cannot rotate and unscrew itself from position because it is longer than the limb 6a.

Some modification of the shape of the cross chain end link and of the helix is obviously possible without departing from the invention. In use the cross chains can be quickly set in place and will not come off. Also the helix does not retain the cross chain snugly up against the side chain and permits freedom of movement within the helix. However, no movement far enough to bring the long portion 6b of the cross chain end link to the position of Figure 3 will be possible with cross chains of anywhere near the proper dimensions for a given tire to be protected.

If a cross chain wears out on the road, the helices can be unscrewed and a new cross chain inserted without the use of tools. The helices are as strong if not stronger, than any cross chain link.

As shown the helix is longer end for end than the opening in the side chain link. This is desirable but not necessary.

Having thus described my invention, what I claim as new and desire to secure by Letters Patent is:

1. In a tire chain a cross chain attaching device comprising an end cross chain link with a short limb and two long limbs, and a helix of a diameter to engage around said end link and a link of a side chain, said helix having its end bent so as to extend its overall length to one greater than the length of the short limb of the cross chain end link, for the purpose described.

2. The structure of claim 1 in which the spacing between the bends of the helix is close to the thickness of the limbs of the end cross chain link.

3. In a tire chain a cross chain attachment comprising an end cross chain link of triangular formation having two long limbs and a shorter limb, and an attaching helix of a diameter to engage around said end link and a link of a side chain, said helix being formed with extended ends which are out of engagement with either link, but which give the helix an overall length greater than that of the shorter limb of the cross chain end link, for the purpose described.

ELMER SCHABER.

REFERENCES CITED

The following references are of record in the file of this patent:

UNITED STATES PATENTS

| Number | Name | Date |
| --- | --- | --- |
| 479,145 | Whitworth | July 19, 1892 |
| 1,295,669 | Addison | Feb. 25, 1919 |
| 1,411,580 | Ottinger | Apr. 4, 1922 |
| 1,650,715 | Hildebrandt | Nov. 29, 1927 |
| 1,905,997 | Drury | Apr. 25, 1933 |
| 2,181,662 | MacDonnell | Nov. 28, 1939 |
| 2,290,494 | Renner | July 21, 1942 |